United States Patent
Zimmerman

(10) Patent No.: US 8,999,247 B2
(45) Date of Patent: Apr. 7, 2015

(54) PROCESS FOR REACTING A PETROLEUM FRACTION

(71) Applicant: UOP LLC, Des Plaines, IL (US)

(72) Inventor: Paul R. Zimmerman, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 13/654,022

(22) Filed: Oct. 17, 2012

(65) Prior Publication Data

US 2013/0037447 A1 Feb. 14, 2013

Related U.S. Application Data

(62) Division of application No. 12/144,082, filed on Jun. 23, 2008, now Pat. No. 8,313,705.

(51) Int. Cl.
| | |
|---|---|
| C10G 45/56 | (2006.01) |
| C10G 47/26 | (2006.01) |
| C10G 49/12 | (2006.01) |
| C10G 65/10 | (2006.01) |
| C10G 49/26 | (2006.01) |
| C10G 47/36 | (2006.01) |
| B01J 8/18 | (2006.01) |
| B01J 8/22 | (2006.01) |
| C10G 45/00 | (2006.01) |

(52) U.S. Cl.
CPC ............... *C10G 49/12* (2013.01); *C10G 49/26* (2013.01); *C10G 47/26* (2013.01); *C10G 47/36* (2013.01); *C10G 65/10* (2013.01); *B01J 8/1818* (2013.01); *B01J 8/22* (2013.01); *B01J 2208/0061* (2013.01); *B01J 2219/0004* (2013.01); *C10G 45/00* (2013.01); *C10G 45/56* (2013.01); *C10G 2300/107* (2013.01); *C10G 2300/1077* (2013.01); *C10G 2300/301* (2013.01)

(58) Field of Classification Search
CPC ........ C10G 45/56; C10G 47/26; C10G 47/36; C10G 49/12; C10G 49/26; C10G 65/10
USPC .......................... 208/121, 143–145, 209, 244
See application file for complete search history.

(56) References Cited

U.S. PATENT DOCUMENTS

| | | | | |
|---|---|---|---|---|
| 4,755,281 | A * | 7/1988 | Penick ........................ | 208/108 |
| 4,762,607 | A * | 8/1988 | Aldridge et al. ............... | 208/59 |
| 6,569,314 | B1 * | 5/2003 | Iaccino et al. .................. | 208/58 |
| 6,660,157 | B2 * | 12/2003 | Que et al. ...................... | 208/108 |
| 6,712,955 | B1 * | 3/2004 | Hou et al. ................. | 208/216 R |
| 6,755,962 | B2 * | 6/2004 | Banerjee ....................... | 208/67 |
| 2002/0112987 | A1 * | 8/2002 | Hou et al. ..................... | 208/108 |
| 2005/0241993 | A1 * | 11/2005 | Lott et al. ..................... | 208/108 |

* cited by examiner

*Primary Examiner* — Renee E Robinson

(57) ABSTRACT

In one exemplary embodiment, a system for reacting a first feed can include a petroleum fraction having at least about 90%, by volume, with a boiling point of at least about 300° C. The system can include a bubble column reactor. The bubble column reactor, in turn, can include a first inlet for the first feed and a second inlet for a second feed including a gas rich in hydrogen. In addition, the petroleum fraction may be in counter-current flow with respect to the gas rich in hydrogen inside the bubble column reactor.

16 Claims, 2 Drawing Sheets

PROCESS FOR REACTING A PETROLEUM FRACTION

CROSS-REFERENCE TO RELATED APPLICATION

This application is a Division of copending application Ser. No. 12/144,082 filed Jun. 23, 2008, the contents of which are hereby incorporated by reference in its entirety.

FIELD OF THE INVENTION

This invention generally relates to a process for reacting a petroleum fraction.

DESCRIPTION OF THE RELATED ART

Typically, a hydrocracking process is used in a large number of petroleum refineries. Such a process can be used to react a feed, such as a heavy crude oil residual fraction. In general, the hydrocracking process can split feed molecules into smaller molecules having a higher average volatility and a greater economic value. At the same time, a hydrocracking process can improve material quality by increasing the hydrogen to carbon ratio of the stream and by removing sulfur and nitrogen.

In some hydrocarbon conversion processes, a slurry reactor or a bubble column reactor (hereinafter may be referred to as a bubble column reactor) receives feeds of a heavy crude oil residual fraction and a gas reactant, such as hydrogen. Generally, the heavy crude oil residual fraction is in co-current flow with the gas reactant inside the reactor. Unfortunately, these co-current processes can suffer from several disadvantages.

First, the upflow bubble column reactor typically has a low hydrogen purity at the top of the reactor near the liquid product outlet. Regrettably, a high hydrogen purity at the outlet is generally desired for converting substances, such as pitch, one or more aromatics, sulfur, and nitrogen, in the heavy crude oil residual fraction. In addition, a co-current upflow design can be susceptible to solids accumulation at the bottom of the reactor. These solids can be removed by activating an intermittent stream at the bottom of the reactor. But such a process may require identification of such accumulated material, which can require greater vigilance of operating personnel or automated control systems to activate the stream for removing the solids. In either case, additional resources are required to remove the solids.

Consequently, it would be beneficial to provide a system that overcomes these shortcomings.

SUMMARY OF THE INVENTION

In one exemplary embodiment, a system for reacting a first feed can include a petroleum fraction having at least about 90%, by volume, with a boiling point of at least about 300° C. The system can include a bubble column reactor. The bubble column reactor, in turn, can include a first inlet for the first feed and a second inlet for a second feed including a gas rich in hydrogen. In addition, the petroleum fraction may be in counter-current flow with respect to the gas rich in hydrogen inside the bubble column reactor.

Another exemplary embodiment can provide a system for reacting a first feed in a plurality of bubble column reactors. The system can include a first bubble column reactor and a second bubble column reactor. The first bubble column reactor may receive first and second feeds. The first feed can include a petroleum fraction having at least about 90%, by volume, with a boiling point of at least about 300° C., and the second feed may include a first gas rich in hydrogen. The petroleum fraction can be in counter-current flow with respect to the first gas rich in hydrogen in the first bubble column reactor. The second bubble column reactor may receive a third feed of a bottom product from the first bubble column reactor including another petroleum fraction, and a fourth feed of a second gas rich in hydrogen. The another petroleum fraction may be in counter-current flow with respect to the second gas rich in hydrogen in the second bubble column reactor.

A further exemplary embodiment can be a process for reacting a first feed including a petroleum fraction stream having at least about 90%, by volume, with a boiling point of at least about 300° C. The process may include passing counter-currently a petroleum fraction entraining a catalyst with respect to a gas rich in a hydrogen gas in a bubble column reactor.

The embodiments disclosed herein can provide several benefits. Particularly, the petroleum fraction in counter-current reaction flow with the gas can provide the highest hydrogen purity at an outlet to facilitate converting pitch, one or more unsaturated compounds, one or more aromatics, sulfur, and/or nitrogen. Desirably, the gas is in upflow and the petroleum fraction is in downflow. Moreover, hydrogen purity is lowest near the petroleum fraction inlet, where conversion of pitch, unsaturated compounds, aromatics, sulfur, and/or nitrogen is comparatively easier, and is highest near the petroleum fraction outlet. In addition, the counter-current arrangement can prevent the accumulation of solids in the reactor because there is a continuous outlet for the petroleum fraction from the bottom. What is more, the reactor can provide a gas-suspension separation at the top of the reactor. As a result, additional equipment, such as a hot separator, can be eliminated. This can be particularly useful for a plurality of reactors because the petroleum fraction product from the first reactor can be fed directly to the next reactor without requiring additional heating.

DEFINITIONS

As used herein, the term "fluid" can mean one or more gases and/or one or more liquids.

As used herein, the term "gas" can mean a single gas or a solution of a plurality of gases. In addition, the term "gas" may include a solution or a suspension, e.g., a vapor or an aerosol, of one or more liquid particles and/or one or more solid particles, of the same or different substances, in one or more gases.

As used herein, the term "liquid" can mean a single liquid, or a solution or a suspension of a plurality of liquids and/or solid particles. A liquid can include a liquid entraining a plurality of solid particles, such as a suspension of catalyst particles in a petroleum fraction, such as an atmospheric or a vacuum tower bottom. A suspension can include an unconverted, converted, or partially converted petroleum fraction.

As used herein, the term "petroleum fraction" generally means a heavy hydrocarbon fraction originating from sources such as a vacuum residue, an atmospheric residue, a vacuum gas oil, an atmospheric gas oil, a heavy atmospheric gas oil, a steam crack gas oil, deasphaltic gas oil, and/or a heavy catalytic cycle oil, although lighter fractions may also be present. The term "petroleum fraction" can refer to the fraction alone or the fraction suspending one or more solid particles, e.g., catalyst particles. The term "petroleum fraction" can also refer to a heavy hydrocarbon fraction that has undergone conversion with a gas reactant inside a bubble column reactor to become, e.g., a product, and may have a different composition and/or boiling point as compared to a feed petroleum fraction.

As used herein, the term "rich" can mean an amount generally of at least about 50%, and preferably about 70%, by mole, of a compound or class of compounds in a stream.

As used herein, the term "substantially" can mean an amount generally of at least about 90%, preferably about 95%, and optimally about 99%, by mole, of a compound or class of compounds in a stream.

DETAILED DESCRIPTION

Figure 1:
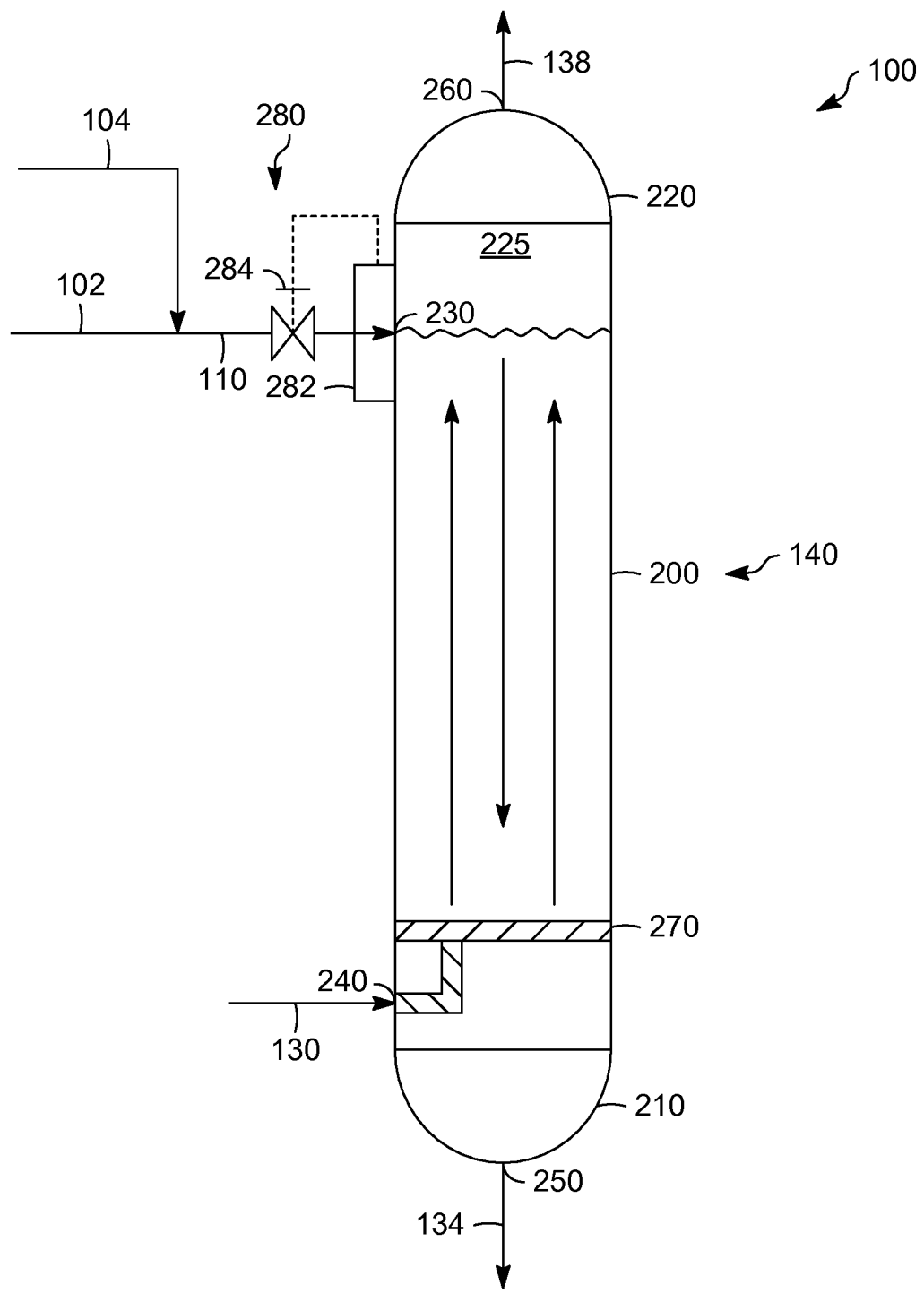
FIG. 1 is an elevational, partial cross-sectional schematic depiction of an exemplary bubble column reactor.

Referring to FIG. 1, an exemplary system 100 for hydrogenating one or more unsaturated aromatic and non-aromatic compounds, converting at least one hydrocarbon compound comprised in, e.g., pitch, and/or removing at least one of nitrogen and sulfur from one or more hetero-compounds in a petroleum fraction is depicted. The system 100 can include a bubble column reactor 200 that can receive a first feed 110 and a second feed 130. The first feed 110 can include a petroleum fraction stream 102 combined with one or more catalyst particles in a catalyst stream 104. A combination of the petroleum fraction stream 102 and the catalyst stream 104 can form a solid-in-liquid suspension as the first feed 110. Typically, at least about 90%, by volume, of the petroleum fraction stream 102 has a boiling point of at least about 300° C., desirably over about 520° C., and optimally over about 524° C., as determined by ASTM D-1160-06. The petroleum fraction stream 102 can include a vacuum residue, an atmospheric residue, a vacuum gas oil, an atmospheric gas oil, a heavy atmospheric gas oil, a steam crack gas oil, a deasphaltic gas oil, and/or a heavy catalytic cycle oil, although lighter fractions may also be present. Desirably, the petroleum fraction stream 102 is at least one of an atmospheric tower bottom and a vacuum tower bottom, and can generally be referred to as a heavy hydrocarbon oil feed.

Regarding the catalyst stream 104, any suitable bubble column catalyst can be utilized. Exemplary catalyst particles can include at least one group VIII metal, preferably iron. One exemplary catalyst can be an iron salt, such as iron sulfate, as disclosed in U.S. Pat. No. 4,963,247. Generally, the catalyst particles can be any suitable size. Some exemplary catalyst particles have, respectively, at least one dimension less than about 45 microns, desirably less than about 10 microns, and optimally less than about 5 microns. Preferably, the catalyst particles are generally spherical in shape and have a diameter less than about 45 microns, desirably less than about 10 microns, and optimally less than about 5 microns. The catalyst particles can comprise about 0.01 to about 4.0%, preferably about 0.5 to about 3.0%, and optimally about 1.0 to about 2.5%, by weight, of the first feed 110 based on the weight of the first feed 110.

The second feed 130 can include a reactant gas, such as a gas rich in hydrogen, or a gas substantially including hydrogen. The gas can be provided in amounts of about 150 to about 9,000 standard $m^3$/per $m^3$, preferably about 200 to about 2,000 standard $m^3$/per $m^3$, and optimally about 500 to about 1,500 standard $m^3$/per $m^3$ of the first feed 110. The gas rich in hydrogen can be from one or more sources within the refinery, such as a recycled gas, a make-up gas, or other sources.

Generally, the bubble column reactor 200, which is depicted in partial cross-section about the middle of the reactor 200, has a first inlet 230, a second inlet 240, a first outlet 250, and a second outlet 260. The first feed 110 can be provided to the first inlet 230, so that a suspension of the petroleum fraction and the catalyst particles may fill much of the bubble column reactor 200. Generally, the suspension of the petroleum fraction and catalyst particles flows downward in the bubble reactor 200 towards the first outlet 250. The second feed 130 can be provided to the second inlet 240 and the reactant gas can rise in the bubble column reactor 200 towards the second outlet 260. Typically, the bubble column reactor 200 is operated under any suitable conditions, such as a pressure of about 3.5 to about 27.6 MPa, preferably about 6.9 to about 20.7 MPa, and optimally about 10.3 to about 17.2 MPa; a reactor temperature of about 350° to about 600° C., preferably about 400° to about 500° C., and optimally about 430° to about 460° C.; and at a liquid hourly space velocity (LHSV) of about 0.1 $hr^{-1}$ to about 2.0 $hr^{-1}$, preferably about 0.2 to about 1.0 $hr^{-1}$, and optimally about 0.25 to about 0.75 $hr^{-1}$.

The second feed 130 can be provided at the second inlet 240 in communication with a gas distributor 270. The gas distributor 270 can be any suitable shape, such as a linear, elongated tube, a grid in the form of a prism, or a ring, with a plurality of orifices providing a distribution of hydrogen in the bubble reactor 200. The hydrogen can bubble upwards through the reactor 200 so that the solid-in-liquid suspension and the gas particles are in a counter-current flow 140. The solid-in-liquid suspension can flow downward towards a base 210 of the bubble column reactor 200 to the first outlet 250 and provide a first product 134, which is typically a suspension of solid catalyst particles in at least a partially converted liquid petroleum fraction. Generally, one or more unreacted gases, such as hydrogen, and one or more product gases, such as one or more naphtha distillate components, escape upwards to a top 220 of the bubble column reactor 200 and can exit the second outlet 260 to provide a second product 138.

In one preferred embodiment, a level control system 280 can be provided. The level control system 280 can include a level controller 282 and a control valve 284. A level control system 280 can allow disengagement of the solid-in-liquid suspension and the product gas at the top 220 of the bubble column reactor 200. Thus, a gap 225 is created between the product gases and the solid-in-liquid suspension. As a consequence, additional equipment, such as a hot separator, can be avoided and such an elimination can provide cost savings. Although the control valve 284 is depicted on the first feed stream 110, it should be understood that the one or more control valves can be located at other locations, such as proximate to the first outlet 250, instead of the control valve 284.

In operation, the first feed 110 can be received in the first inlet 230 to substantially fill the bubble column reactor 200, while the second feed 130 including the gas rich in hydrogen can be received in the second inlet 240. The solid-in-liquid suspension can flow downward in counter-flow to the rising gas. The solid-in-liquid suspension can be converted with the partial pressure being greatest near the first outlet 250. The at least partially converted solid-in-liquid suspension can exit through the first outlet 250, as a solid-in-liquid suspension "slurry" product 134. The level control system 280 can create the gap 225 to allow a gas of one or more unreacted gases, e.g., hydrogen, and one or more product gases, such as naphtha distillate components, exit as the second product 138 via the second outlet 260.

Generally, the bubble column reactor 200 is operated with a counter-current flow 140 to increase the hydrogen partial pressure proximate to the base 210 and the first outlet 250 to facilitate conversion, saturation, hydrodesulfurization, and/or hydrodenitrification, such as hydrogenating one or more unsaturated aromatic and non-aromatic compounds, and removing at least one of nitrogen and sulfur from one or more hetero-compounds. In addition, the counter-current flow design can prevent solids accumulation at the base 210, providing time and/or capital savings by eliminating or reducing operators' vigilance and/or equipment.

Figure 2:
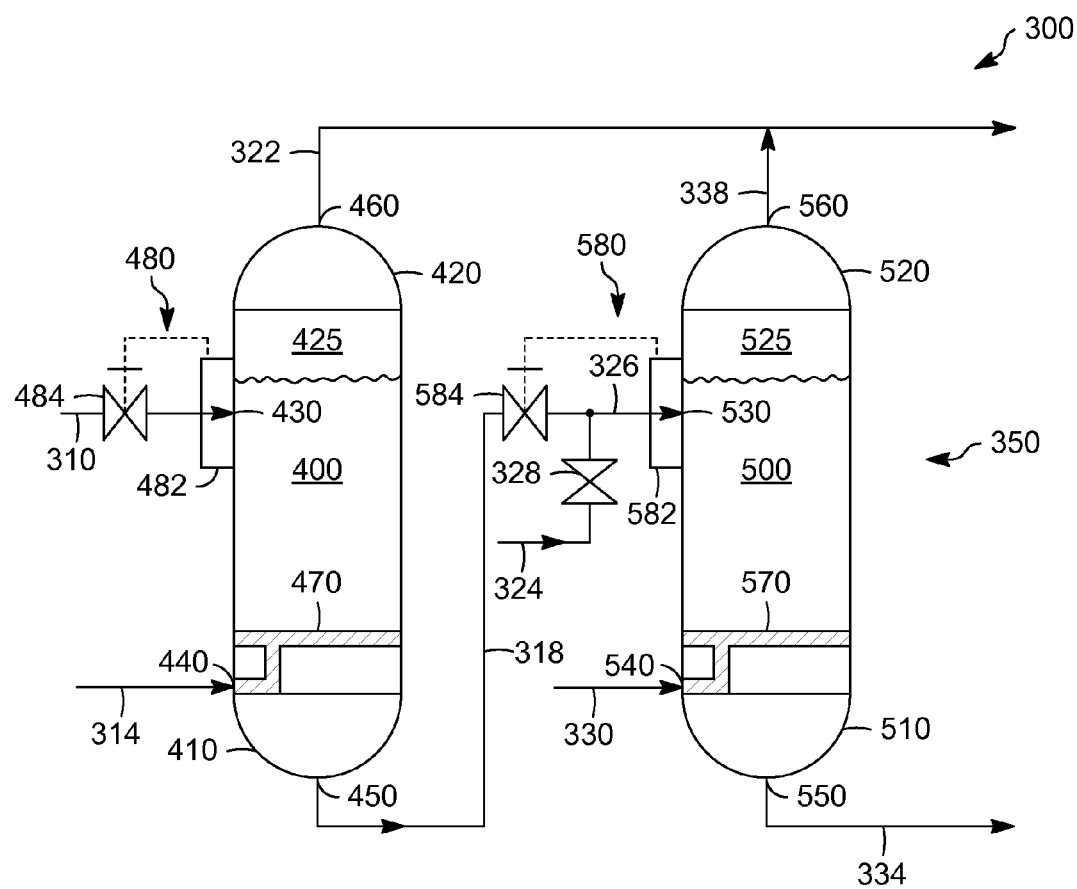
FIG. 2 is an elevational, partial cross-sectional schematic depiction of a plurality of exemplary bottom column reactors.

Referring to FIG. 2, a second system 300 is depicted. The second system 300 can include a plurality of bubble column reactors 350, namely a first bubble column reactor 400 and a second bubble column reactor 500. The bubble reactors 400 and 500 and their respective components are generally the same and can generally receive the same feeds and operate in the same manner as the bubble column reactor 200 described in the first system 100. However, the second bubble column reactor 500 can operate up to about 50° C., preferably up to about 25° C., and optimally about 5° to about 15° C. higher than the first bubble column reactor 400. Moreover, a liquid hourly space velocity (LHSV) for the second system 300 as a whole can be about 0.1 $hr^{-1}$ to about 2.0 $hr^{-1}$, preferably about 0.2 to about 1.0 $hr^{-1}$, and optimally about 0.25 to about 0.75 $hr^{-1}$.

The first bubble column reactor 400 can include a base 410, a top 420, a first inlet 430, a second inlet 440, a first outlet 450, a second outlet 460, and a gas distributor 470. The first bubble column reactor 400 can receive a first feed 310, typically a solid catalyst in a liquid petroleum fraction suspension at the first inlet 430, and a second feed 314 including a gas rich in or substantially including hydrogen at the second inlet 440. Generally, a stream including catalyst can be combined with a stream including a petroleum fraction before forming the first feed 310, as described above for FIG. 1. The first bubble column reactor 400 can produce a base product 318, which can be at least a partially converted petroleum fraction suspending catalyst particles, and a second product 322 including a gas. The gas can include one or more unreacted gases and naphtha distillate components.

A level control system 480, including a level controller 482 and a control valve 484, can provide a gap 425 of one or more gases and the solid-in-liquid suspension in the first bubble column reactor 400 to disengage the one or more gases, similarly as described above for the level control system 280 for the system 100.

The bubble column reactor 500 can include a base 510, a top 520, a first inlet 530, a second inlet 540, a first outlet 550, a second gas outlet 560, and a gas distributor 570. The second bubble column reactor 500 can receive a third feed 326, typically a solid-in-liquid suspension of the bottom product 318 of the first bubble column reactor 400, at the first inlet 530. However, it should be understood that the first feed 310, typically a solid-in-liquid petroleum fraction suspension, to the first bubble column reactor 400 is generally different, e.g., heavier, than the third feed 326 to the second bubble column reactor 500 due to conversion of various fractions in the first feed 310. Moreover, an optional stream 324 that can include a heavy gas oil stream rich in polar aromatics, such as a slurry hydrocracker vacuum gas oil or a fluid catalytic cracking slurry oil, can be combined with the bottom product 318 by, e.g., opening a valve 328. The combined stream 326 can have about 5 to about 50%, by weight, of the stream 324 based on the weight of the combined stream 326. Adding the stream 324 can control coking reactions in the bubble column reactor 500.

A fourth feed 330 including a gas rich in or substantially including hydrogen may be provided at the second inlet 540. The gas provided as the fourth feed 330 can be from the same or a different source as the second feed 314. In one preferred embodiment, the second feed 314 can be a recycle gas and the fourth feed 330 can be a make-up gas. The second bubble column reactor 500 can produce a third product 334, which can be a solid-in-liquid suspension of a catalyst and another at least partially converted petroleum fraction. A fourth product 338 can include a gas of one or more unreacted gases, e.g., hydrogen, and one or more product gases, such as naphtha distillate components.

A level control system 580, including a level controller 582 and a control valve 584, can separate gases and the liquid suspension in the bubble column reactor 500 and can provide a gap 525, similarly as described above for the level control systems 280 and 480.

In operation, the first feed 310 can fill a substantial portion of the bubble column reactor 400 and flow downward toward the first outlet 450. The second feed 314 entering near the base 410 through the second inlet 440 is provided to the gas distributor 470. The gas can bubble upwards counter-currently through the solid-in-liquid suspension. The gas can flow upwards towards the second outlet 460. Any one or more unreacted gases and gas products can be comprised in the second product 322. The reacted and unreacted portions of the solid-in-liquid suspension can flow downwards out the first outlet 450 to provide a feed to the second bubble column reactor 500.

The bottom product 318 from the first bubble column reactor 400 can enter the first inlet 530 as a third feed 326. The feed 326 can enter the reactor and fill a substantial portion of the reactor 500. At the second inlet 540, a second feed of a gas rich in hydrogen can be provided. The gas can enter the inlet 540 to the gas distributor 570 and be distributed through the solid-in-liquid suspension. Generally, the solid-in-liquid suspension and the gas can be in counter-current flow. The reacted and unreacted portions of the solid-in-liquid suspension can flow downwards out the first outlet 550 to provide the third product 334, which can be a suspension of one or more at least partially converted petroleum fractions and catalyst particles. Any unreacted gases and gas reaction products can be comprised in the fourth product 338. The second product 322 may be combined with the fourth product 338 and can exit the second system 300.

Optionally, the solid-in-liquid suspension "slurry" product 334 can be sent to a warm high pressure separator. An exemplary warm high pressure separator can operate at a temperature of about 40° to about 200° C. and a pressure of about 100 kPa to 20,000 kPa. The combined gas products 322 and 338 can be sent to a cold high pressure separator. An exemplary cold high pressure separator can operate at a temperature of about 32° to about 100° C. and at a pressure of about 100 kPa to about 20,000 kPa. Although a warm high pressure separator and a cold high pressure separator have been disclosed, any equipment or process can be further used to process the product streams. Any such separators can be provided to separate a lighter fraction from a heavier one. Similarly, the equipment, such as separators, and/or processes can also be used with the system 100 described above.

One benefit of the second system 300 can be improved energy efficiency because the solid-in-liquid suspension product 318 of the first bubble column reactor 400 may not be reheated for a subsequent reactor, such as the second bubble column reactor 500.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth uncorrected in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for reacting a first feed comprising a petroleum fraction stream having at least about 90%, by volume, with a boiling point of at least about 300° C., comprising receiving in a bubble column reactor the first feed including the petroleum fraction combined with one or more catalyst particles and passing counter-currently the petroleum fraction entraining the one or more catalyst particles with respect to a gas rich in a hydrogen gas in the bubble column reactor, wherein the first feed including the petroleum fraction entraining the one or more catalyst particles is received in the bubble column reactor proximate to a top of the bubble column reactor;
controlling a liquid level in the bubble column reactor to allow the petroleum fraction to disengage from the hydrogen gas in a gap above an inlet for the first feed in the bubble column reactor.

2. The process according to claim 1, wherein the catalyst comprises iron and has a diameter of less than about 45 microns.

3. The process according to claim 1, wherein the process hydrogenates one or more unsaturated aromatic and non-aromatic compounds, and removes at least one of nitrogen and sulfur from one or more hetero-compounds.

4. The process according to claim 1, wherein the catalyst particles comprise about 0.01 to about 4.0%, by weight, of the first feed.

5. The process according to claim 1, further comprising passing counter-currently said base product with respect to a gas rich in a hydrogen gas in the second bubble column reactor, wherein the base product is received in the second bubble column reactor proximate to a top of the second bubble column reactor.

6. A process for reacting a first feed comprising a petroleum fraction stream having at least about 90%, by volume, with a boiling point of at least about 300° C., comprising receiving a catalyst stream proximate to a top of a first bubble column reactor and passing counter-currently the petroleum fraction entraining the catalyst stream with respect to a gas rich in a hydrogen gas in the first bubble column reactor; controlling a liquid level in the first bubble column reactor to allow the petroleum fraction to disengage from the hydrogen gas in a gap above an inlet for the first feed in the first bubble column reactor; said first bubble column reactor producing a base product comprising at least a partially converted petroleum fraction suspending catalyst particles and receiving said base product in a second bubble column reactor and operating said second bubble column reactor at about 5 to about 50° C. higher than said first bubble column reactor.

7. The process according to claim 6, wherein the catalyst comprises iron and has a diameter of less than about 45 microns.

8. The process according to claim 6, wherein the process hydrogenates one or more unsaturated aromatic and non-aromatic compounds, and removes at least one of nitrogen and sulfur from one or more hetero-compounds.

9. The process according to claim 6, wherein the catalyst particles comprise about 0.01 to about 4.0%, by weight, of the first feed.

10. The process according to claim 6, further comprising passing counter-currently said base product with respect to a gas rich in a hydrogen gas in the second bubble column reactor, wherein the base product is received in the second bubble column reactor proximate to a top of the second bubble column reactor.

11. A process for reacting a first feed comprising a petroleum fraction stream having at least about 90%, by volume, with a boiling point of at least about 300° C., comprising receiving in a first bubble column reactor the first feed including the petroleum fraction combined with one or more catalyst particles and passing counter-currently the petroleum fraction entraining the one or more catalyst particles with respect to a gas rich in a hydrogen gas in the first bubble column reactor and controlling a liquid level in the first bubble column reactor to allow the petroleum fraction to disengage from the hydrogen gas in a gap above an inlet for the first feed in the first bubble column reactor; said first bubble column reactor producing a base product comprising at least a partially converted petroleum fraction suspending catalyst particles and receiving said base product and an added oil stream in a second bubble column reactor.

12. The process according to claim 11, wherein the first feed including the petroleum fraction entraining the one or more catalyst particles is received in the bubble column reactor proximate to a top of the bubble column reactor.

13. The process according to claim 11, wherein the catalyst comprises iron and has a diameter of less than about 45 microns.

14. The process according to claim 11, wherein the process hydrogenates one or more unsaturated aromatic and non-aromatic compounds, and removes at least one of nitrogen and sulfur from one or more hetero-compounds.

15. The process according to claim 11, wherein the catalyst particles comprise about 0.01 to about 4.0%, by weight, of the first feed.

16. The process according to claim 11, further comprising passing counter-currently said base product with respect to a gas rich in a hydrogen gas in the second bubble column reactor, wherein the base product is received in the second bubble column reactor proximate to a top of the second bubble column reactor.

* * * * *